US008528888B2

(12) United States Patent
Header

(10) Patent No.: US 8,528,888 B2
(45) Date of Patent: Sep. 10, 2013

(54) FLANGED MATERIAL AND STANDING SEAM CLAMP

(76) Inventor: Gregory A. Header, Richland, PA (US)

(*) Notice: Subject to any disclaimer, the term of this patent is extended or adjusted under 35 U.S.C. 154(b) by 305 days.

(21) Appl. No.: 13/118,308

(22) Filed: May 27, 2011

(65) Prior Publication Data
US 2012/0299233 A1 Nov. 29, 2012

(51) Int. Cl.
B23Q 3/02 (2006.01)

(52) U.S. Cl.
USPC .................................. 269/91; 52/24

(58) Field of Classification Search
USPC ............. 269/165, 172, 203, 216, 239, 257, 269/91; 24/513, 517, 409; 52/24
See application file for complete search history.

(56) References Cited

U.S. PATENT DOCUMENTS

| | | | |
|---|---|---|---|
| 1,568,122 A | 1/1926 | Zifferer | |
| 2,815,557 A * | 12/1957 | Jorgensen | 24/510 |
| 2,985,174 A * | 5/1961 | Guth | 24/67.1 |
| 3,039,161 A * | 6/1962 | Gagnon | 24/490 |
| 3,964,149 A | 6/1976 | Hugh | |
| 4,901,963 A * | 2/1990 | Yoder | 24/489 |
| 4,901,964 A * | 2/1990 | McConnell | 248/231.51 |
| 6,442,805 B2 * | 9/2002 | Pfister | 24/514 |
| 6,536,166 B1 * | 3/2003 | Alley | 52/25 |
| 6,718,718 B2 | 4/2004 | Haddock | |
| 7,013,612 B2 * | 3/2006 | Haddock | 52/545 |
| 7,100,338 B2 * | 9/2006 | Haddock | 52/545 |
| 7,127,852 B1 | 10/2006 | Dressler | |
| 7,240,770 B2 * | 7/2007 | Mullins et al. | 182/3 |
| 7,386,922 B1 | 6/2008 | Taylor et al. | |
| 7,513,080 B1 * | 4/2009 | Showalter | 52/24 |
| 7,703,256 B2 | 4/2010 | Haddock | |
| 7,758,011 B2 | 7/2010 | Haddock | |
| 8,038,106 B2 | 10/2011 | Magno, Jr. et al. | |
| 8,070,119 B2 * | 12/2011 | Taylor | 248/237 |

(Continued)

FOREIGN PATENT DOCUMENTS

| | | |
|---|---|---|
| CN | 1155762 | 6/2004 |
| EP | 2395175 | 12/2011 |

(Continued)

OTHER PUBLICATIONS

PCT/US2012/039283 International Search Report dated Aug. 3, 2012 (1 page).
SnapNrack, technical data sheet, 2 pgs., Aug. 3, 2010.
SnapNrack, technical data sheet, 4 pgs., Nov. 30, 2010.
Aceclamp, technical data sheet, 5 pgs., May 2010.
S-5-U Clamp, technical data sheet, 2 pgs., 2010.

Primary Examiner — Lee D Wilson
Assistant Examiner — Jamal Daniel
(74) Attorney, Agent, or Firm — Shlesinger, Arkwright & Garvery LLP

(57) ABSTRACT

A clamping assembly for attaching loads to various kinds of flanged seams, the assembly comprising a generally U-shaped clamp body, at least one clamping hammer disposed interior of the clamp body, the clamping hammer being hingedly secured to the clamp body along the longitudinal axis of the clamp body, at least one adjustment screw extending through the clamp body and adapted to selectively impinge against the clamping hammer and cause it to pivot about its axis, the adjustment screw extending transverse to the longitudinal axis of the clamping hammer, at least one locking screw adapted to selectively impinge against the clamping hammer to prevent pivoting of the same whereby a standing seam received within the clamp body may be tightly grasped between the clamp body and the clamping hammer under action of the adjustment screw and then locked into place by the locking screw.

20 Claims, 5 Drawing Sheets

(56) References Cited

U.S. PATENT DOCUMENTS

| | | | |
|---|---|---|---|
| 2002/0088196 A1* | 7/2002 | Haddock | 52/543 |
| 2005/0102958 A1 | 5/2005 | Anderson | |
| 2005/0257434 A1* | 11/2005 | Hockman | 52/24 |
| 2005/0284995 A1 | 12/2005 | Hutter, III | |
| 2008/0302928 A1 | 12/2008 | Haddock | |
| 2010/0012805 A1 | 1/2010 | Taylor | |
| 2010/0058701 A1 | 3/2010 | Yao et al. | |
| 2010/0284737 A1 | 11/2010 | McPheeters | |
| 2011/0214367 A1 | 9/2011 | Haddock et al. | |

FOREIGN PATENT DOCUMENTS

| | | |
|---|---|---|
| GB | 2476104 | 6/2011 |
| JP | 2010-196422 A | 9/2010 |
| JP | 2011140861 | 7/2011 |
| WO | 2012021505 | 2/2012 |

* cited by examiner

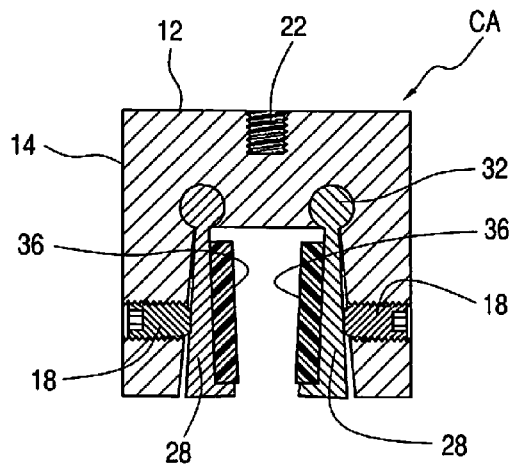
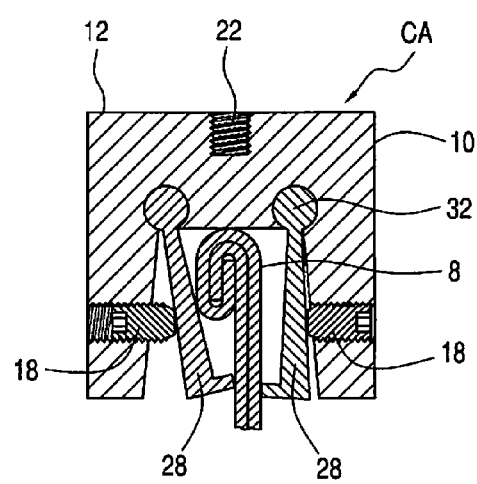
FIG. 6　　　FIG. 7
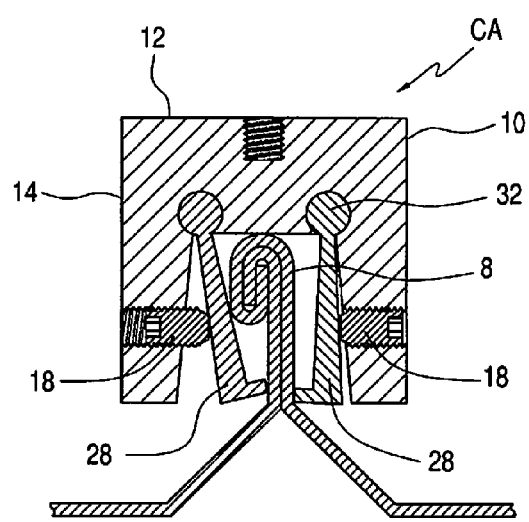
FIG. 8

FLANGED MATERIAL AND STANDING SEAM CLAMP

FIELD OF THE INVENTION

This invention is a clamp assembly for attaching loads to various kinds of flanged seams including, but not limited to, standing seam roofing.

BACKGROUND OF THE INVENTION

Standing seams are often used to interconnect metal panels to form the roof of a building or other structure. The seam is created by bending and profiling together adjacent side edges of two metal sheets to form an upwardly extending portion that interlocks the sheets as it extends the width or length of the roof surface. The head or uppermost portion of the seam may be formed in a variety of shapes depending upon the manner in which the sheets are profiled together. For example, the head of a standing seam may be L-shaped, T-shaped, rounded, doubled over or have some other profile correlating to the nature of end use.

It is desirable to attach a structure to a standing seam, especially in the case of roofing. Rooftops are obvious locations for mounting of solar panel arrays, walkways, plumbing, wiring or other ancillary structures including but not limited to snow catchers, ice dams, etc.

When attaching a structure to standing seam, drilling or penetration of the seam is avoided because doing so can affect the life of the roof. Clamp assemblies that do not penetrate a standing seam are known; however, these devices use bolts that are tightened directly against the seam which can damage the seam and ultimately affect the integrity of the roof. Prior art clamping assemblies also produce an uneven clamping pressure that is not evenly distributed against the seam eventually leading to clamp or roof failure. Many other roofs clamps are known, but in each of these cases the device is complicated and difficult to install quickly.

BRIEF SUMMARY OF THE INVENTION

The present invention is a clamping assembly comprising a generally U-shaped clamp body for receiving a standing seam, an I-beam or similar structure, either a pair of cooperating clamping hammers or a single clamping hammer are disposed interior of the clamp body, the clamping hammers are hingedly secured to the clamp body along a longitudinal axis of the body and each is provided with at least one adjustment screw adapted to movably extend through the clamp body and selectively impinge against the hammer and cause it to pivot about its axis to open and close the clamp, the adjustment screw being disposed transverse to the longitudinal axis of the clamping hammer, each clamping hammer is also provided with at least one locking screw that movably extends through the clamp body to selectively impinge against the hammer and prevent pivoting whereby a standing seam or other structure received within the clamp body may be tightly grasped between the pair of cooperating hammers (or single hammer) to clamp and lock it into place.

BRIEF DESCRIPTION OF THE SEVERAL VIEWS OF THE DRAWINGS

FIG. 6 is a cross-sectional view of an alternative embodiment of the clamp assembly shown in FIG. 4;

FIG. 7 is cross sectional view of the clamp shown in FIG. 4 when clamping a double lock type standing seam;

FIG. 8 is cross-sectional view of the clamp shown in FIG. 4 when clamping a trapezoid double lock type standing seam;

FIG. 13 is a cross-sectional view showing an alternative embodiment of one clamp according to the present invention having an isolation membrane to protect a roof or other structure from vibration, sound or the like.

DETAILED DESCRIPTION OF THE INVENTION

Figure 1:
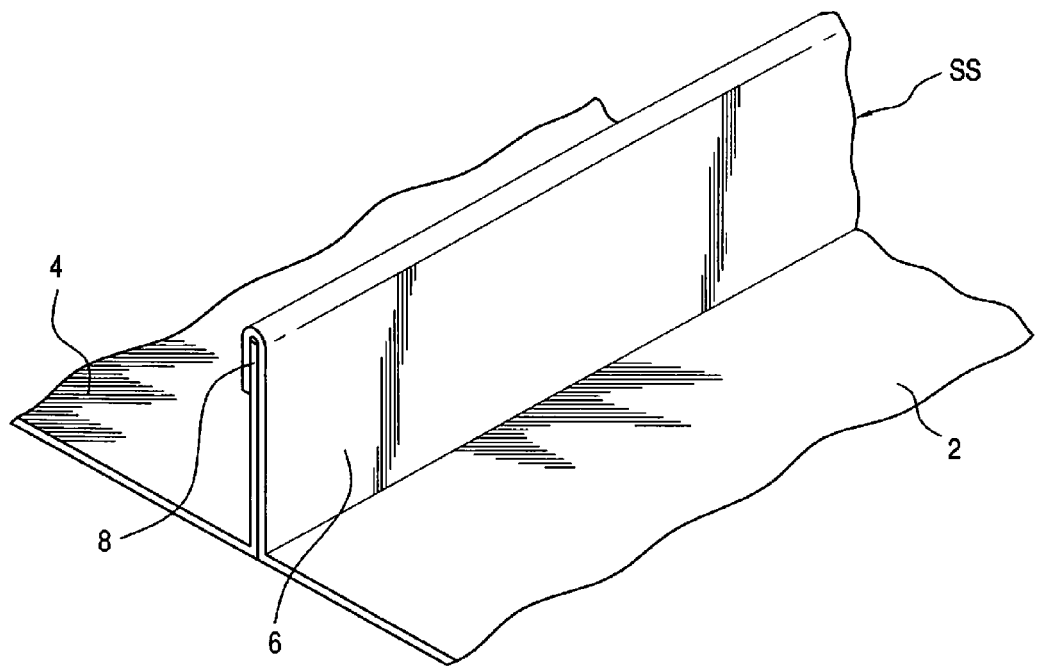
FIG. 1 is a perspective view showing a typical overlap type standing seam that may be clamped by the present invention.

FIG. 1 shows a standard overlap-type standing seam SS comprising metal sheets 2 and 4 interconnected at upstanding portion 6 and head portion 8. The standing seam SS is formed by bending or profiling together adjacent edges of sheets 2 and 4 to interlock the edges at head portion 8 in a known manner. The present invention is applicable for clamping other standing seams as will be explained further below.

Figure 2:
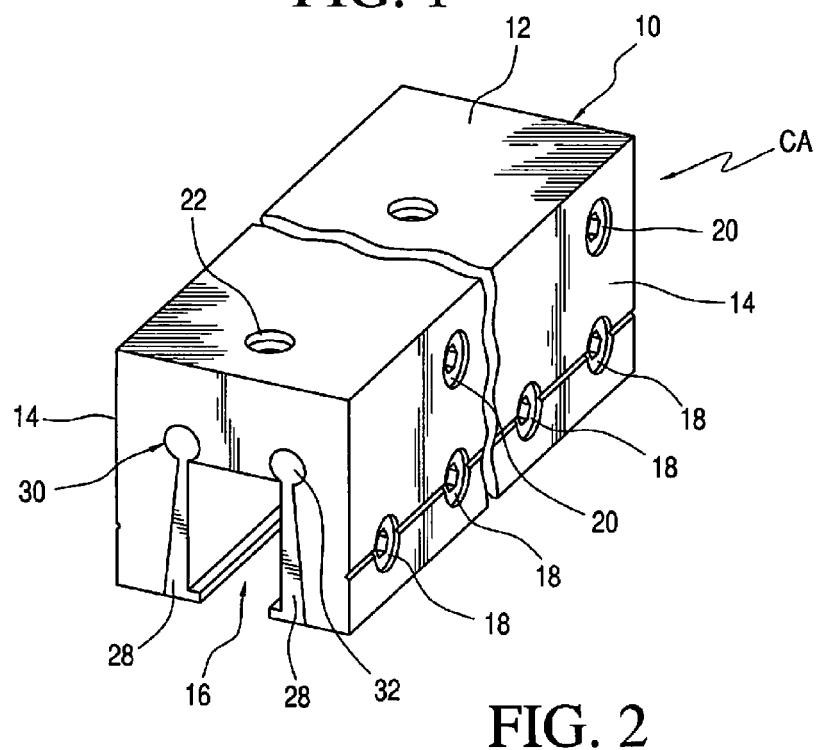
FIG. 2 is a perspective view showing the clamp assembly according to the present invention with portions broken away.

Referring to FIGS. 2 though 5, the clamp assembly CA of the present invention is shown in greater detail. As best seen in FIG. 2, the clamp assembly CA comprises a generally U-shaped clamp body 10, formed from metal such as extruded aluminum or a high density plastic or other material, and having a top 12 and sides 14 that define an interior region 16 for receiving a standing seam. The clamp body 10 may be of variable length and thickness depending upon the end use of the clamp and the strength requirements necessary for that particular use.

Adjustment screws 18 are provided along both sides 14 of the clamp body. The apertures for each of the adjustment screws 18 are disposed adjacent the bottom edge of each side 14 and each extends through the sides 14 so such that the adjustment screw may be selectively moved into and out of interior region 16 of the clamp body.

Locking screws 20 may be provided along both sides 14 of the clamp body. The apertures for each of the locking screws 20 are disposed adjacent the top edge of each side 14 and each extends through the sides 14 so that it can be selectively moved into and out of the interior region 16 of the clamp body to lock the clamp onto a seam as will be further explained below. The number of locking screws 20 and adjustment screws 18 provided on the clamp is variable. In general, the clamp body 10 will have a pair of adjustment screws on each of side of the clamp, the pairs aligned as mirror images and at least one locking screw per side.

A threaded aperture 22 is provided within the top 12 of the clamp body 10 to receive a threaded bolt (not shown) that may be used to attach a solar panel, wiring or other structure to the clamp body. Similarly, and as best shown in FIGS. 3 and 4, a threaded aperture A may be provided in either or both of the sides 14 of the clamp body to receive a threaded bolt (not shown) to attach a solar panel, wiring, or some other structure to the clamp body.

Figure 3:
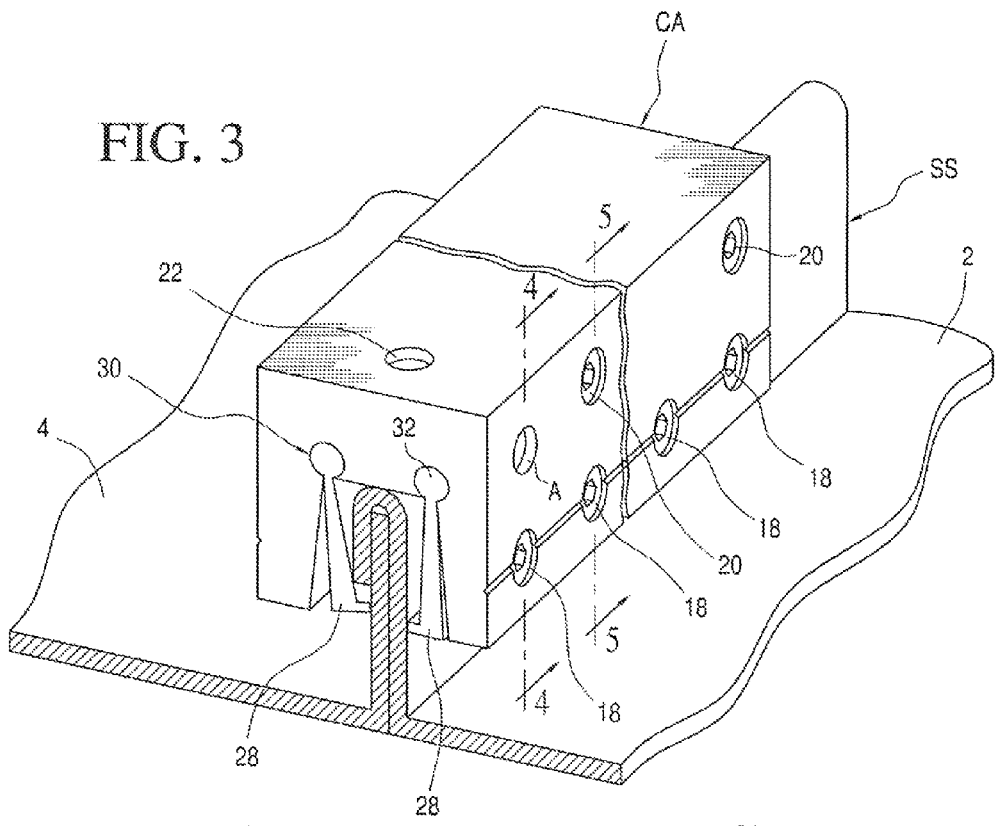
FIG. 3 is perspective view of the clamp shown in FIG. 2 when clamping standing seam with portions of the clamp shown in broken lines.
Figure 4:
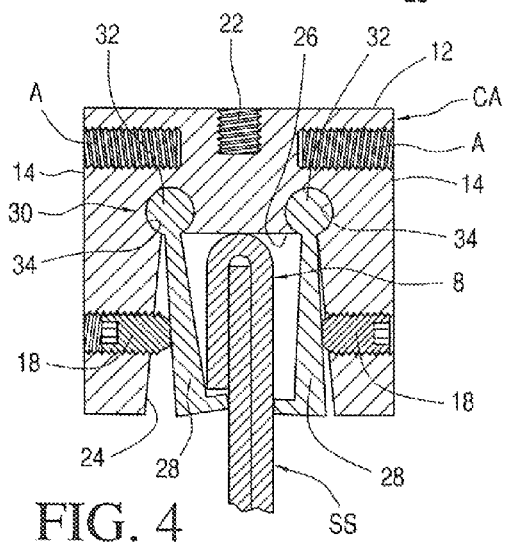
FIG. 4 is a cross-sectional view taken along lines 4-4 of FIG. 3.
Figure 5:
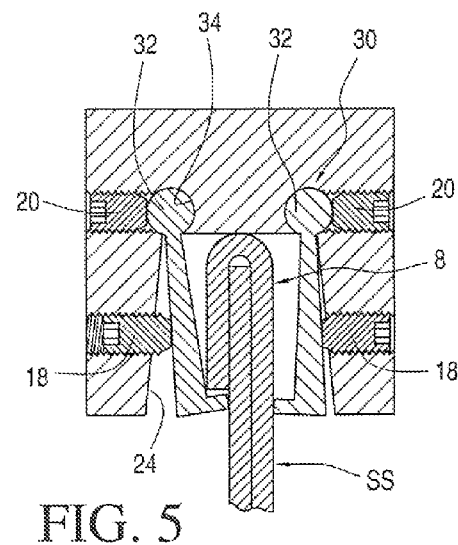
FIG. 5 is a cross-sectional view taken along lines 5-5 of FIG. 3.

Turning to FIGS. 3 through 5, additional features of the clamp assembly CA are shown together with operation of the clamp. The interior region 16 comprises side walls 24 and top wall 26. The width and height of interior region 16 may be varied depending upon the size of the standing seam to be clamped.

A pair of movable clamping jaws or hammers 28 are provided within interior region 16 of the clamp body 10 for clamping against a seam. As best shown in FIGS. 4 and 5, the clamping hammers are disposed as mirror images of each other and in one embodiment, are generally L-shaped to accommodate the head portion of a conventional folded seam as will be further explained below. The hammers 28 extend the length of the clamp body 10 from a first end to a second end and are pivotally secured within the clamp body at hinge member 30. The hammers may be constructed from metal, such as extruded aluminum, or from a high density plastic or other material suitable to the use of the clamp.

Hinge member 30 comprises a cylindrical member 32, provided at the top of the clamping hammer 28 and extending the length of the hammer, and a cooperating groove 34 provided within the clamp body, the groove 34 sized to receive the cylindrical member 32 such that hammer 28 is adapted to freely pivot about the longitudinal axis of hinge member 30. During assembly of the clamp, a series of inwardly extending detents (not shown) may be provided at each end of the groove 34 to retain the clamping hammer 28 within the groove 34.

As best shown in FIG. 4, the adjustment screws 18 are aligned transverse to the longitudinal axis of the clamping hammers 28. Selectively turning the adjustment screw 18 will cause it to move inwardly or outwardly and consequently, into and out of engagement with a respective clamping hammer 28. When a standing seam SS is disposed interior of clamp body 10 and the adjustment screws 18 associated with the clamping hammers 28 are turned inwardly, the hammers are likewise caused to pivot inwardly about hinge 30 and engage against the upstanding portion 6 of a seam SS. The L-shape of the clamping hammers 28 allow the head portion 8 of the seam to be received between the hammers without damaging the head. The present invention generates a clamping pressure against the seam that is continuous and evenly distributed along the entire length of the clamp assembly. By spreading the load along the length of the clamp, damage to the seam is avoided and failure of the clamp is greatly reduced.

As best shown in FIG. 5, after the seam SS is engaged by the clamping hammers, the locking screws 20 associated with each of the hammers are tightened which causes the screw to contact cylindrical member 32 and prevent pivoting of hinge 30 which is then in a locked position. As is apparent, to remove the assembly from a seam, the adjustment and locking screws are loosened which causes the hammers to pivot out of engagement thereby allowing the clamp to be separated from the seam.

FIG. 6 illustrates an alternative embodiment of the present invention whereby the inwardly facing surfaces of the clamping hammers 28 have secured to the surfaces an elastomeric coating (or a sheet) of material to provide an isolation membrane 36 for purposes of, for example, dampening vibration or providing insulation to the clamped seam.

FIG. 7 illustrates the clamp assembly of the present invention when clamped to a double lock standing seam. In this embodiment, the clamping hammers are angled inwardly to a greater degree than would be the case with an overlap type standing seam. The invention is adapted to accommodate different kinds of seams having varying shapes and head sizes.

FIG. 8 illustrates the clamp assembly of the present invention when clamping to a trapezoid double lock type standing seam.

Figure 9:
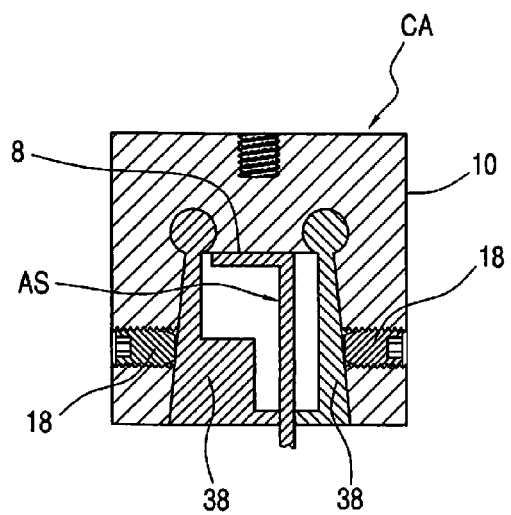
FIG. 9 is a cross-sectional view showing an alternative embodiment of the clamp shown in FIG. 4 when clamping an angled seam.

FIG. 9 illustrates an alternative embodiment of the present invention. The clamping hammer 28 noted earlier are interchanged in this embodiment to adapt the clamp assembly CA to clamp an angled seam AS. In this embodiment, one of the two clamping hammers in FIGS. 2 through 5 is replaced with an angled seam clamping hammer 38. The angled seam clamping hammer 38 is shown to have a stepped configuration to accommodate the head portion 8 of the angled seam AS which extends transverse to the longitudinal axis of the seam.

Figure 10:
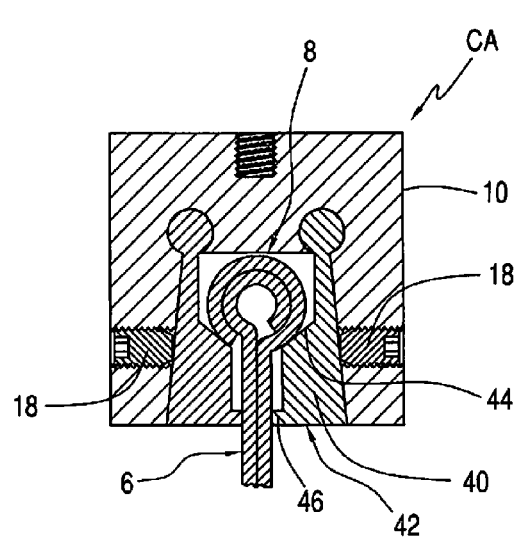
FIG. 10 is a cross-sectional view showing an alternative embodiment of the clamp shown in FIG. 4 when clamping a seam having a round head.

FIG. 10 illustrates a further embodiment of the present invention. Both clamping hammers in this embodiment are changed from that shown in the previous embodiments so as to adapt the clamp assembly CA for clamping a seam having a round head 8. The round head clamping hammers 42 include an abutment region 40 that extends inwardly and includes a downwardly sloping surface 44 for engaging the lower regions of the rounded head 8 and jaw portions 46 for engaging the upstanding portion of the seam.

Figure 11:
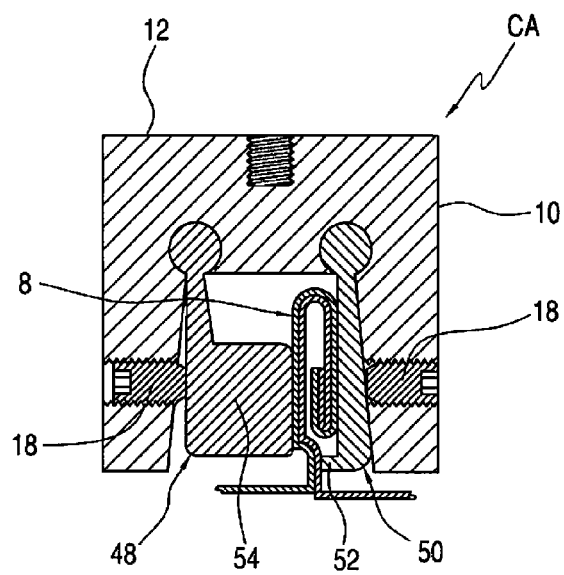
FIG. 11 is a cross-sectional view showing an alternative embodiment of the clamp shown in FIG. 4 when clamping an off-set seam.

FIG. 11 illustrates another embodiment of the present invention. Both clamping hammers in this embodiment are changed from that shown in the previous embodiments so as to adapt the clamp assembly CA for clamping a seam having an offset head 8. The offset head clamping hammers 48 and 50 have different thicknesses and heights. Offset head clamping hammer 50 has a greater height than offset head clamping hammer 48 and further includes a jaw portion 52. Offset head clamping hammer 48 includes a thickened region or abutment 54 so that when the hammers are urged against the offset head 8, it is held securely between both hammers and the top 12 of the clamp body is maintained parallel to the surface from which the seam extends.

Figure 12:
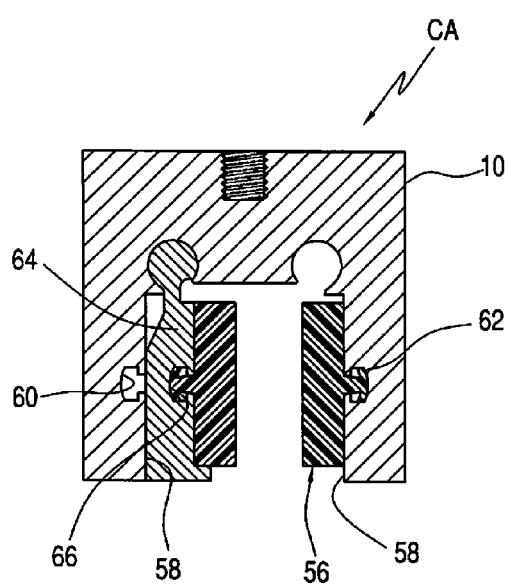
FIG. 12 is a cross-sectional view showing an alternative embodiment of the clamp according to the present invention with a pair of protective gaskets.

FIG. 12 illustrates another embodiment of the present invention. In this embodiment, the interior wall surfaces 58 of the clamp body 10 are provided with parallel keyway tracks 60 extending the length of the clamp for selectively receiving a gasket or membrane 56 having a male keyway portion 62 adapted to interfit and interlock the keyway track 60. A modified clamping hammer 64 is provided at the opposite side of the gasket or membrane 56. The modified clamping hammer 64 is shown to include a keyway track 66 for receiving a male keyway portion 68 of gasket or membrane 70. An adjustment screw 18 (not shown) is provided to cause the modified clamping hammer 64 to move inwardly and clamp and insulate (sound, vibration, etc.) a seam between the resilient gasket or membrane 56 and 70.

Figure 13:
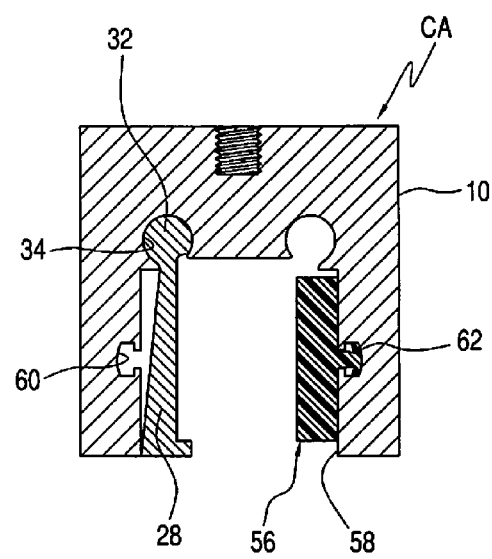

FIG. 13 is an alternative embodiment of FIG. 12 wherein a clamping hammer 28 as shown in FIGS. 2 through 5 is used in place of the modified clamping hammer 64 to clamp the seam (not shown) between a gasket or membrane 56 and the clamping hammer 28 by way of adjustment screws (not shown) and locking screws (not shown). As can be seen, the gasket or membrane 56 is provided with a key member 62 that interlocks with the interior wall 58 of U-shaped member 10 at female keyway 60.

While this invention has been described as having a preferred design, it is understood that it is capable of further modifications, uses and adaptations, both in whole and in part, while following the general principle of the invention and including such departures from the present disclosure as is known or customary practice in the art to which this invention pertains, and as may be applied to the central features of this invention.

I claim:

1. A clamping assembly comprising:
   a) a generally U-shaped clamp body having an interior region for receiving a structure to be clamped;
   b) at least one clamping hammer disposed within the interior region of the clamp body, the clamping hammer is hingedly secured to the clamp body along the longitudinal axis thereof;
   c) at least one adjustment screw extending through the clamp body and adapted to selectively impinge against the clamping hammer so as to cause it to pivot about its longitudinal axis, the adjustment screw extending transverse to the longitudinal axis of the clamping hammer; and
   d) at least one locking screw adapted to selectively impinge against the clamping hammer to prevent pivoting of the same whereby a structure to be clamped that is received within the clamp body may be tightly clamped by the clamping hammer under action of the adjustment screw and locked into place by the locking screw.

2. A clamping assembly as in claim 1 wherein the clamp body comprises a top wall and a pair of side walls, the side walls aligned as mirror images and the top wall and side walls having interior and exterior surfaces respectively.

3. A clamping assembly as in claim 2 and further comprising a second clamping hammer, the at least one clamping hammer and the second clamping hammer are aligned as mirror images and disposed within the interior region of the clamp body.

4. A clamping assembly as in claim 3 wherein each of the at least one adjustment screw and the second adjustment screw extends through a separate one of the pair of side walls and are aligned along a common longitudinal axis.

5. A clamping assembly as in claim 3 and further comprising:
   a) at least one cylindrical recess, the at least one cylindrical recess extends into the interior surface of the top wall and is adjacent one of the side walls and extends along the longitudinal axis of the clamp body; and
   b) the at least one clamping hammer having at one end thereof a cylindrical hinge member that is received within the at least one cylindrical recess such that the at least one clamping hammer is hingedly movable between the side walls.

6. A clamping assembly as in claim 5 and further comprising:
   a) a second cylindrical recess, the second cylindrical recess extends into the interior surface of the top wall, is adjacent one of the side walls and extends along the longitudinal axis of the clamp body; and
   b) the second clamping hammer having at one end thereof a cylindrical hinge member that is received within the second cylindrical recess so that the second clamping hammer is hingedly movable between the side walls to clamp a standing seam or other structure therebetween.

7. A clamping assembly as in claim 6 and further comprising a second locking screw, the second locking screw extends through one of the side walls and is transverse to the longitudinal axis of the second clamping hammer such that the second locking screw is adapted to selectively impinge upon the cylindrical hinge member of the second clamping hammer and prevent pivoting of the same.

8. A clamping assembly as in claim 5 wherein the at least one locking screw extends through one of the side walls and is transverse to the longitudinal axis of the at least one clamping hammer such that the screw is adapted to selectively impinge upon the cylindrical hinge member and prevent pivoting of the same.

9. A clamping assembly as in claim 3 wherein the at least one clamping hammer and the second clamping hammer are generally L-shaped in cross-section.

10. A clamping assembly as in claim 3 wherein one of the at least one clamping hammer and second clamping hammer are generally step-shaped in cross-section.

11. A clamping assembly as in claim 3 wherein the at least one clamping hammer and the second clamping hammer are shaped to accommodate therebetween the head portion of a standing seam to be clamped.

12. A clamping assembly as in claim 3 and further comprising an elastomeric material, the elastomeric materials is secured to one of the at least one clamping hammer and second clamping hammer.

13. A clamping assembly as in claim 2 and further comprising a second adjustment screw, the at least one adjustment screw and the second adjustment screw extend through one of the pair of side walls and into the interior region of the clamp body.

14. A clamping assembly as in claim 2 and further comprising a threaded aperture, the threaded aperture extends into the exterior surface of at least one of the clamp body top wall and side walls.

15. A clamping assembly comprising:
   a) a one-piece clamp body, the clamp body has a top wall, a pair of side walls and an interior region therebetween;
   b) a pair of clamping jaws, the clamping jaws are disposed within the interior region and each jaw of the pair of clamping jaws is hingedly secured to the clamp body and adjacent a separate one of the pair of side walls to restrict pivoting to within the interior region;
   c) at least first and second adjustment screws, the first adjustment screw extends through one wall of the pair of side walls to selectively engage against one of the clamping jaws and cause pivoting of the same toward the opposite of the pair of clamping jaws, the second adjustment screw extends through a separate wall of the pair of side walls to selectively engage against a separate one of the clamping jaws and cause pivoting of the same toward the opposite of the pair of clamping jaws, the first and second adjustment screws are transverse to the longitudinal axis of the clamp body; and
   d) at least first and second locking screws, each one of the first and second locking screws extends through a separate one of the pair of side walls to selectively impinge against one of the clamping jaws where it is hingedly secured to the clamp body and to prevent pivoting of the same whereby a structure to be clamped that is received within the interior region may be clamped between the pair of locking jaws under action of the first and second adjustment screws and locked into place by the first and second locking screws.

16. A clamp assembly as in claim 15 and further comprising additional adjustment screws and locking screws.

17. A clamp assembly as in claim 15 and further comprising a threaded aperture, the threaded aperture extends into at least one of the top wall and the side walls.

18. A clamp assembly as in claim 15 wherein each jaw of the pair of clamping jaws is generally L-shaped in cross-section and aligned within the interior region of the clamp body as a mirror image of the other of the pair of clamping jaws.

19. A clamping assembly as in claim 15 wherein each jaw of the pair of clamping jaws is shaped to accommodate the head portion of a standing seam.

20. A clamping assembly as in claim 15 and wherein each clamping jaw of the pair of clamping jaws having at one end thereof a cylindrical hinge member adapted to pivotally engage a cylindrical recess extending within the clamp body and above the side wall to which it is adjacent.

* * * * *